April 23, 1963    J. A. WEEDMAN    3,086,965
POLYMER RECOVERY
Filed Jan. 10, 1958
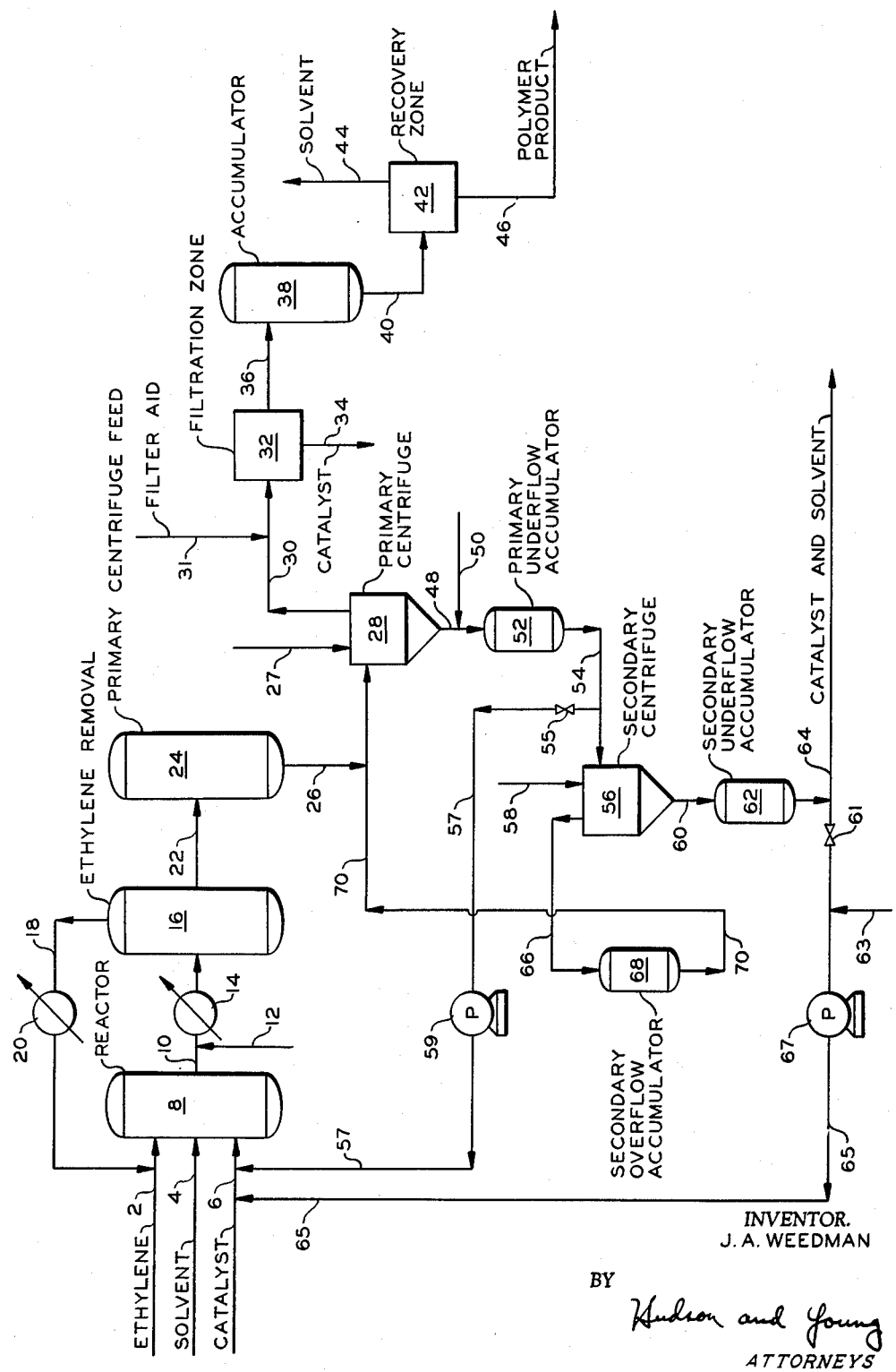
INVENTOR.
J. A. WEEDMAN
BY
Hudson and Young
ATTORNEYS

United States Patent Office 3,086,965
Patented Apr. 23, 1963

3,086,965
POLYMER RECOVERY
John A. Weedman, Bartlesville, Okla., assignor to Phillips Petroleum Company, a corporation of Delaware
Filed Jan. 10, 1958, Ser. No. 708,243
6 Claims. (Cl. 260—94.9)

This invention relates to a polymer recovery process. In one aspect it relates to the recovery of polymer from a polymerization effluent. In another aspect it relates to the treatment of an effluent from the polymerization of an olefin in the presence of subdivided solid catalyst to recover solid polymer substantially free from said catalyst.

A preferred method for the polymerization of olefins to solid polymers comprises carrying out the reaction in the presence of a subdivided mobile catalyst. In many instances however, the problem of recovering or removing the solid polymerization catalyst from the polymer product entails substantial difficulties because of the physical characteristics of the polymer. For example the polymer tends to be very sticky when wet and is inclined to agglomerate and adhere to process equipment. As a result the polymerization process is preferably carried out in the presence of the solvent material whereby the polymer during its formation and after its removal from the reaction zone can be maintained in solution. Recovery of catalyst from the polymerization effluent can be effected by centrifugation, as set forth in the copending application of J. E. Cottle, Serial No. 606,140, filed August 24, 1956, now Patent No. 2,914,518. While this method of recovery provides a polymer product which contains only a small amount of catalyst solids, it has been found that a more complete separation is sometimes desirable to improve the properties of the polymer product. In particular it has been found that the amount of catalyst present in the polymer product is an important factor in determining the odor of said product.

It is an object of this invention to provide an improved process for the recovery of olefin polymer.

Another object of this invention is to provide an improved process for the separation of subdivided chromium oxide polymerization catalyst from an olefin polymer solution.

Still another object of the invention is to provide a process for improving the odor of solid olefin polymers produced through the catalytic action of subdivided chromium oxide catalyst.

Yet another object of this invention is to provide a process for reducing the quantity of catalyst in solid olefin polymer produced in the polymerization of an olefin in the presence of chromium oxide catalyst.

Still another object of the invention is to provide an improved process for improving the separation of chromium oxide catalyst from a solution of ethylene polymer.

Another object of the invention is to reduce catalyst consumption.

These and other objects of the invention will become more readily apparent from the following detailed description and discussion.

The foregoing objects are achieved broadly by subjecting a stream containing subdivided chromium oxide catalyst, dissolved olefin polymer and solvent to centrifugation followed by filtration and recovering from the filtrate a polymer product containing not more than about 1 part per million of chromium.

In one aspect of the invention the filtration step is carried out in the presence of a solid filter-aid material.

This invention is applicable in general to the treatment of olefin polymers such as, for example, polymers or copolymers of monoolefins like ethylene, propylene, butylene, etc.; also, copolymers of monoolefins and diolefins such as butadiene, isoprene, etc. These polymers are prepared usually by contacting the olefin to be polymerized with a catalyst in the presence of a solvent or diluent material at an elevated temperature and pressure. A number of catalytic materials can be used for the purpose of polymerizing olefins, the most desirable being chromium oxide, preferably containing hexavalent chromium, with silica, alumina, zirconia, thoria, silica-alumina, etc. These catalysts can be prepared, for example, by contacting soluble salts of chromium with silica, alumina, thoria, etc., for a sufficient period of time to impregnate the latter material. Following this, excess liquid is removed, for example, by filtering after which the solid catalysts are dried and activated at temperatures in the range of 450° F. to 1500° F. under non-reducing conditions for several hours. For a detailed discussion of the catalysts, their composition and their methods of preparation, reference can be had to the copending application of Hogan and Banks, Serial No. 573,877, filed March 26, 1956, now Patent No. 2,825,721, wherein the catalysts are discussed in detail. These and other solid catalysts or catalysts containing a solid component can be treated in the method of this invention.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is maintained at a sufficient level to assure a liquid phase reaction, that is, at least about 100 to 300 p.s.i.g., depending upon the type of feed material and the polymerization temperature. Higher pressures up to 500 to 700 p.s.i.g. or higher can be used, if desired. The catalyst concentration in the reactor varies from between about 0.01 and about 10 percent by weight. Generally, it is desirable to provide a reactant residence time of between about 15 minutes and about 12 hours.

The use of a diluent in the polymerization reaction in general serves two purposes. Since the reactions are usually exothermic in nature, the presence of a quantity of diluent provides a method for obtaining close control of the reaction temperature. In addition, as previously stated, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic paraffins having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents can also be used; however, in some instances they (or impurities therein) tend to shorten the catalyst life, therefore, their use will depend on the importance of catalyst life. All of the foregoing and in addition, other hydrocarbon diluents which are relatively inert and in the liquid state at the reaction conditions may also be employed in carrying out the reaction of olefins to form solid polymers.

Although the invention is applicable to polymerization systems in general, it finds particular use in processes for the polymerization of 1-olefins having a maximum of 8 carbon atoms per molecule and no branching nearer the double bond than the 4-position; and more particularly in processes for the polymerization of ethylene under conditions which provide polymers of ethylene which have a density of at least 0.94 and preferably 0.96 or higher and a crystallinity of at least 70 percent and preferably at least 80 percent at ambient temperatures. While the polymerization of ethylene provides a preferred embodiment of the invention, it is not intended that the scope of the invention be limited thereby but that any of the other processes described are also within the invention.

One method of preparing polymers of olefins is described in detail in a copending application of Hogan and Banks, Serial No. 573,877, filed March 26, 1956, now Patent No. 2,825,721. This particular method utilizes a chromium oxide catalyst, preferably containing hexavalent chromium, with silica, alumina, silica-alumina, zirconia, thoria, etc. In the method of the Hogan et al. application, olefins are polymerized in the presence of a hydrocarbon diluent, for example, an acyclic, alicyclic or aromatic compound which is inert and in which the formed polymer is soluble. The reaction is ordinarily carried out at a temperature between about 150° F. and about 450° F. and under a pressure sufficient to maintain the reactant and diluent in the liquid states. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity at normal atmospheric temperatures.

In carrying out the invention in one embodiment thereof polymerization reaction product containing subdivided chromium oxide catalyst, and olefin polymer, such as ethylene polymer, dissolved in a solvent, such as cyclohexane, is introduced to a centrifuging zone. In this zone separation between polymer solution and catalyst is effected, with the polymer solution passing from the upper part of centrifuging zone as overflow and the catalyst from the lower portion as underflow. It is desirable that the catalyst-polymer-solvent feed being introduced to the centrifuging zone contain a high concentration of solvent, such that the polymer concentration of this stream is maintained between about 2 and about 6 percent by weight. Centrifugation can be carried out in a single stage or two or more stages in series can be provided, if more efficient separation is desired. The particular operating conditions employed in this portion of the catalyst recovery process depends on a number of factors, including the particular polymer and solvent present in the effluent stream being treated. Centrifugation is preferably carried out in a temperature range within which the polymer is substantially completely soluble in the solvent, usually between about 200 and about 400° F. For example, when separating chromium oxide cataylst containing hexavalent chromium from a solution of ethylene polymer and cyclohexane, the temperature of the polymer solution entering the centrifuging zone can vary between about 250 and about 350° F., and preferably is maintained at about 300° F. Sufficient pressure is maintained on the centrifuging zone or zones and accompanying equipment to maintain the solvent in the liquid state at the process temperatures employed. Usually the pressure is held between about 25 and about 200 p.s.i.g. When it is desirable to maintain the pressure above the vapor pressure of the solvent, additional pressure can be provided by introducing to the centrifuging zones an inert gas such as nitrogen, methane, ethane, superheated solvent, etc.

The degree of solids separation obtained in the centrifugation operation is determined by a number of factors, including catalyst size and distribution, the relative quantity of the overflow and underflow streams from the centrifugation zone and the quantity of polymer, solids and solvent in the centrifuge feed stream. Usually the catalyst solids range in size from between about 0.1 micron to about 100 microns. In normal operation it is possible to provide an overflow solution from the centrifuging zone containing between about 2 and about 6 percent polymer by weight based on the solvent and having a catalyst content ranging from 0.0 to about 0.05 percent by weight based on the polymer, and preferably 0.0 to about 0.02 percent. When operating in these ranges the chromium content of the polymer product varies from less than 1.0 to as high as 10 parts per million of chromium.

The overflow from the centrifugation operation which is substantially free from catalyst is passed through a filtration zone wherein additional catalyst is removed, such that the resulting polymer product contains not more than about 1 part of chromium per million parts of polymer. The filtration operation can be carried out in any conventional type of filter including, for example, plate type filters, leaf type filters, centrifugal filters, etc. Filtration is carried out in substantially the same temperature and pressure ranges as centrifugation in order to assure maintenance of the solvent in the liquid state and retention of polymer in solution. As desired, solid filter aids can be employed in the filtration to aid in the separation and removal of residual catalyst solids. In general any conventional filter-aid materials can be used including, for example, diatomaceous earth, kieselguhr, activated clays, fuller's earth, etc.

In order to more clearly describe the invention and provide a better understanding thereof reference is had to the accompanying drawing which is a diagrammatic illustration of a polymerization process and catalyst separation system suitable for carrying out the invention. Referring to the drawing ethylene, cyclohexane solvent and subdivided chromium oxide catalyst containing hexavalent chromium slurried in cyclohexane are introduced to reactor 8 through conduits 2, 4 and 6, respectively. Within the reactor suitable reaction conditions are maintained, namely a temperature of about 285° F. and a pressure of about 500 p.s.i.a., whereby a portion of the ethylene feed is converted to solid ethylene polymer. Agitation of the reaction mixture is provided by a suitable mixing means (not shown) whereby a substantially uniform suspension of catalyst in liquid is maintained in the reactor. A stream of material containing polymer, cyclohexane, catalyst and unconverted ethylene is removed from the reactor through conduit 10. At this point additional cyclohexane is introduced to the effluent through conduit 12 and the total stream is then passed through a heater 14 wherein the temperature is increased to assure dissolution of the polymer product in the cyclohexane. The effluent stream is then introduced to an ethylene removal zone 16 where any unconverted ethylene is separated and returned to the reactor 8 through conduit 18 and heater 20. Following this separation the reactor effluent, now containing polymer, solvent and catalyst is introduced to centrifuge feed tank 24 through conduit 22. From this vessel material is withdrawn through conduit 26 and introduced to a primary centrifuge 28. Before entering centrifuge 28 the feed material is increased in volume by the addition of overflow material from the secondary centrifuge overflow accumulator 68 through conduit 70. In addition to the primary centrifuge 28 there is provided a secondary centrifuge 56. Both of the centrifuges are adapted to the separation of solids from liquid at elevated temperature and pressures. Each centrifuge is operated so as to provide an overflow product stream of low solids content and an underflow stream concentrated in solids. In order to prevent vaporization of solvent during centrifugation, positive pressure is applied to each centrifuge by introducing thereto an inert gas, in this instance nitrogen, through conduits 27 and 58, respectively. The overflow from the primary centrifuge 28 exists therefrom through conduit 30 and enters a filtration zone 32. If desired a filter aid material, such as diatomaceous earth, can be introduced to the overflow through conduit 31 before this stream enters the filtration zone. Within the filtration zone a further separation of catalyst is made, said catalyst being withdrawn through conduit 34. The liquid effluent from the filtration zone, now comprising essentially polymer in solution, is passed through conduit 36 into accumulator 38 and from there through conduit 40 to recovery zone 42. A further separation between polymer and solvent is effected in zone 42, polymer and solvent being removed through conduits 46 and 44, respectively. The resulting polymer product contains not more than about 1 p.p.m. of chromium.

The primary centrifuge underflow, containing the remainder of the solvent, a major portion of the catalyst solids and a minor proportion of the polymer is passed from the centrifuge through conduit 48 into the primary underflow accumulator 52. For the purpose of providing a minimum loss of polymer from the secondary centrifuge, a quantity of additional solvent is introduced to the primary underflow through conduit 50. The material in accumulator 52 is removed therefrom through conduit 54 and introduced into secondary centrifuge 56 wherein another separation between solids and polymer is effected. A different type of separation occurs in this centrifuge in that the overflow therefrom is controlled to provide a quantity of solids in this stream, the purpose being to effect maximum recovery of polymer in this stage. The overflow stream is returned to the primary centrifuge through conduit 66 and secondary overflow accumulator 68 as previously described. The underflow from the secondary centrifuge contains only about a very small amount of polymer, a large amount of solvent and the major proportion of the catalyst solids. This material is removed from the centrifuge through conduit 60 and introduced to the secondary underflow accumulator 62. The mixture of catalyst and solvent are removed from the latter vessel through conduit 64 for further processing to recover the solvent and catalyst (not shown).

As desired the catalyst (and solvent) can be returned to the reaction zone for reuse. Thus all or a portion of the underflow from primary underflow accumulator 52 can be recycled to the reactor through valve 55, pump 61 and conduit 57. Alternatively, catalyst can be returned to the reactor from the secondary underflow accumulator 62 through valve 61, pump 67 and conduit 65. The latter material is often in a rather viscous state and may require the addition of solvent through conduit 63 to provide a pumpable slurry.

The following data are presented in illustration of the invention in its various aspects.

EXAMPLE I

Ethylene was polymerized in a continuous process in a reactor in the presence of a chromium oxide-silica-alumina catalyst containing 2.5 percent by weight of chromium. Prior to the reaction the catalyst was activated in air by subjecting it to gradually increasing temperatures up to 950° F. The polymer was prepared under the following conditions:

| | | |
|---|---|---|
| Ethylene feed rate | lb./hr | 70–100 |
| Cyclohexane feed rate | lb./hr | 325–550 |
| Polymer concentrations in reactor | wt. percent | 8.0–9.7 |
| Catalyst concentration in reactor | do | 0.04–0.1 |
| Pressure | p.s.i.g | 420 |
| Temperature | °F | 280–320 |
| Residence time | hours | 1.3–2.0 |

A series of 27 runs were made. In each run, following removal of unreacted ethylene, the solution of polymer in cyclohexane was treated for the separation of polymer and catalyst. In runs 1 to 13 the catalyst separation was effected by a standard Merco C–9 unit centrifuge, with a pressure enclosure around the housing of the centrifuge and mechanical seal at the top (see Merco catalog, Bulletin No. 4051, pages 1–4).

In runs 14 to 18 the filtrate from the Merco centrifuge was passed through a filter. The filter employed was a horizontal plate filter made by Sparkler Manufacturing Company of Mundelein, Illinois (see Chemical Engineering Mid-September 1956 Inventory Issue, p. 168).

In runs 19 to 27 a Merco centrifuge and Sparkler filter were also used and in addition diatomaceous earth filter aid was introduced to the filtrate from the centrifuge.

The results of the runs are presented in Table 1.

*Test Data*

| | | Ranges |
|---|---|---|
| Centrifuge speed | r.p.m | 6650–6833 |
| Feed temperature | °F | 250–350 |
| Pressure | p.s.i.g | 80–100 |

TABLE 1

| Run No. | Centrifuge Feed Rate, g.p.m. | Centrifuge Overflow Ash, wt. Percent of Polymer | Sparkler Filtrate Ash, wt. Percent of Polymer | Filter Aid, #/100 gal. | Odor Type [1] |
|---|---|---|---|---|---|
| 1 | 4.2 | 0.019 | | | CW—[2] |
| 2 | 6.0 | 0.010 | | | CW—F [2] |
| 3 | 5.3 | 0.015 | | | CW—F [2] |
| 4 | 5.0 | 0.010 | | | F—F [2] |
| 5 | 5.2 | 0.037 | | | F—F [2] |
| 6 | 6.4 | 0.010 | | | F—CW [2] |
| 7 | 5.1 | 0.020 | | | CW—F [2] |
| 8 | 5.1 | 0.010 | | | F—F [2] |
| 9 | 5.1 | 0.009 | | | F—F [2] |
| 10 | 6.2 | 0.05 | | | F |
| 11 | 6.2 | 0.05 | | | F |
| 12 | 6.4 | 0.02 | | | F |
| 13 | 6.1 | 0.02 | | | IF |
| 14 | 4.4 | 0.01 | 0.02 | | CW |
| 15 | 5.0 | 0.02 | 0.00 | | CW |
| 16 | 4.7 | 0.02 | 0.02 | | W |
| 17 | 4.7 | 0.01 | 0.00 | | W |
| 18 | 4.7 | 0.03 | 0.02 | | CW |
| 19 | 4.8 | 0.01 | 0.01 | ½ | W |
| 20 | 5.0 | 0.01 | 0.02 | ½ | W |
| 21 | 6.2 | 0.02 | 0.02 | ½ | W |
| 22 | 4.2 | 0.05 | 0.02 | ½ | W |
| 23 | 4.0 | 0.15 | 0.01 | ½ | W |
| 24 | 5.4 | 0.04 | 0.00 | ½ | CW |
| 25 | 4.7 | 0.02 | 0.02 | ½ | W |
| 26 | 5.4 | 0.01 | 0.00 | ½ | VW |
| 27 | 5.0 | 0.02 | 0.00 | ½ | VW |

[1] The odor types were determined by a panel of three to four men. Each member of the panel sniffed each of the samples and the resulting odor types constitute a composite of their opinions as to odor. The following terms have been used to classify the types of odor:
W—Wax—samples in this group are defined as those having a waxy odor.
CW—Cracked wax—this is the classification normally given to odors which are a mixture of wax and something which is not identified. Sometimes this is a burnt odor, sometimes a different odor.
F—Fecal—this classification is used for any sample with a sharp unpleasant odor that almost completely masks any waxy odor. It would perhaps be better described as a phenol and aldehyde odor.
IF—Intermediate fecal.
VW—Variation of wax.
[2] Sample tested for odor twice.

Referring to the data in the table it is noted that in the runs wherein separation of polymer solution from catalyst were effected in the centrifuge only the predominating odor was of the fecal type, whereas in the runs utilizing a Sparkler guard filter the odor which predominated was the wax or cracked-wax type. From this it can be concluded that the use of the guard filter provides a polymer product having a less disagreeable odor. It is also to be noted from the data that the use of the guard filter in general provided a reduction in the quantity of ash (solids, including catalyst) in the polymer product.

EXAMPLE II

Another series of ethylene polymerization runs were made under conditions similar to those set forth in Example I. Again the polymer solution was separated from the catalyst and the final polymer product was analyzed to determine the quantity of ash contained therein and also the quantity of chromium. The results of these determinations are set forth in Table 2.

TABLE 2

| Lot No. | Chromium, p.p.m. | Ash, Wt. Percent | Type of Separation | | |
|---|---|---|---|---|---|
| | | | Primary | Sparkler | Filter Aid |
| A | 0.8 | 0.016 | Vallez [1] | Yes | Yes |
| B | 0.3 | 0.001 | Vallez [1] | Yes | Yes |
| C | 1.0 | 0.003 | Merco | Yes | No |
| D | 4.0 | 0.027 | Merco | No | No |

[1] This polymer was filtered in a Vallez filter.

In order to illustrate the effect of chromium content of the polymer on the type of polymer odor, each of the polymers of Table 2 and also various combinations of polymers from Lot B and Lot D were tested for odor type. The results of the test are presented in Table 3.

TABLE 3

| Sample No. | Percent Composition | | Chromium, p.p.m. | Odor type |
|---|---|---|---|---|
| | Lot B | Lot D | | |
| 1 | 100 | 0 | 0.3 | Waxy. |
| 2 | 81 | 19 | 1.0 | Fecal. |
| 3 | 68 | 32 | 1.5 | Waxy. |
| 4 | 54 | 46 | 2.0 | Fecal. |
| 5 | 41 | 59 | 2.5 | Fecal. |
| 6 | 27 | 73 | 3.0 | Fecal. |
| 7 | 0 | 100 | 4.0 | Fecal. |
| 8 | Lot C | | 1.0 | Cracked Wax. |
| 9 | Lot A | | 0.8 | Cracked Wax. |

It is to be noted from the data in Table 3 that when the chromium content of the catalyst increases above 1.0 part per million the odor type is fecal, whereas below 1 part per million the odor type is either waxy or cracked wax.

Having thus described the invention by providing specific examples thereof, it is to be understood that no undue limitations or restriction are to be drawn by reason thereof and that many variations and modifications are within the scope of the invention.

I claim:
1. In a process for improving the odor of an olefin polymer containing a solid chromium oxide catalyst comprising the introduction of a solution of said polymer to a centrifuging zone and removing polymer solution from said zone as an effluent the improvement which comprises introducing said effluent into a filtration zone, removing polymer solution as filtrate from said zone and recovering from said filtrate a polymer product containing not more than about one part per million chromium.

2. The process of claim 1 in which the centrifugation and filtration are carried out at a temperature of between about 200° F. and 400° F. and at a pressure of between about 25 p.s.i.g. and about 200 p.s.i.g.

3. The process of claim 1 in which the filtration step is carried out in the presence of a solid filter aid material.

4. The process of claim 1 in which the olefin polymer is a polymer of a 1-olefin having a maximum of 8 carbon atoms per molecule and no branching nearer the double bond than the 4-position.

5. The process of claim 4 wherein said olefin is ethylene.

6. In a process for improving the odor of an ethylene polymer having a density of at least 0.94 containing a solid chromium oxide catalyst containing hexavalent chromium associated with a supporting material selected from the group consisting of silica, alumina, thoria, and zirconia and composites thereof comprising introducing a paraffin hydrocarbon solution of said polymer to a centrifuging zone and removing an effluent from said zone comprising an ethylene polymer the improvement which comprises introducing said effluent into a filtration zone, subjecting said polymer solution to filtration in the presence of a solid filter aid material, said filtration zone being maintained at a temperature of between 200° F. and about 400° F. and at a pressure of between 25 p.s.i.g. and about 200 p.s.i.g., removing polymer solution as filtrate from said filtration zone and recovering from said filtrate a polymer product having a chromium content of not more than about 1 part per million of chromium.

References Cited in the file of this patent

UNITED STATES PATENTS

| | | |
|---|---|---|
| 2,565,960 | Garber | Aug. 28, 1951 |
| 2,691,647 | Field et al. | Oct. 12, 1954 |
| 2,702,288 | Hoeksema et al. | Feb. 15, 1955 |
| 2,825,721 | Hogan et al. | Mar. 4, 1958 |
| 2,849,429 | Cines | Aug. 26, 1958 |
| 2,914,518 | Cottle | Nov. 24, 1959 |
| 2,978,443 | Goldtrap | Apr. 4, 1961 |